United States Patent [19]

Ceresa et al.

[11] Patent Number: 4,818,515

[45] Date of Patent: Apr. 4, 1989

[54] ALPHA-ALUMINA IN THE FORM OF SPHERICAL NON-AGGREGATED PARTICLES HAVING A NARROW SIZE DISTRIBUTION AND SIZES BELOW 2 MICRONS AND PROCESS FOR PREPARING SAME

[75] Inventors: Emiliano M. Ceresa, Vigliano Biellese; Antonio Gennaro, Cameri; Paolo Cortesi, Chivasso, all of Italy

[73] Assignee: Montedison S.p.A., Milan, Italy

[21] Appl. No.: 102,295

[22] Filed: Sep. 25, 1987

Related U.S. Application Data

[63] Continuation of Ser. No. 818,674, Jan. 14, 1986, abandoned.

[30] Foreign Application Priority Data

Jan. 18, 1985 [IT] Italy ................. 19142 A/85

[51] Int. Cl.$^4$ ................. C01F 7/02
[52] U.S. Cl. ................. 423/625; 423/626
[58] Field of Search ................. 423/625, 626

[56] References Cited

U.S. PATENT DOCUMENTS

| | | | |
|---|---|---|---|
| 2,642,337 | 4/1953 | Newsome | 423/625 |
| 3,003,919 | 10/1961 | Broge | 423/625 |
| 3,336,109 | 8/1967 | Bellary et al. | 423/625 |
| 4,012,337 | 3/1977 | Mitchell | 423/625 |
| 4,529,579 | 7/1985 | Raahauge | 423/625 |

Primary Examiner—Robert L. Stoll
Attorney, Agent, or Firm—Stevens, Davis, Miller & Mosher

[57] ABSTRACT

Alpha-alumina consisting essentially of solid, spherical, non-aggregated particles, having a diameter from 0.06 to 2 $\mu$m, a polydispersion index below 2.0, a total porosity below 0.3 cc/g, a specific surface area from 0.7 to 80 m$^2$/g, and an apparent density of the particles from 3.20 to 3.94 g/cm$^3$. The alpha-alumina is prepared by a process consisting, in that an alpha-alumina precursor, having a water content from 2 to 33% by weight, at starting temperatures ranging from room temperature to 850° C., and consisting essentially of solid spherical, non-aggregated particles, having a particle diameter from 0.07 to 2.3 $\mu$m and a polydispersion index of $\leq 2.0$, is subjected to a heat-treatment at temperatures ranging from 1130° to 1700° C., said precursor being instantaneously brought from the starting temperature to the treatment temperature, and by carrying out the treatment during times, as generally indicated in the accompanying FIG. 1 between straight lines (a) and (b), which are sufficient to convert the precursor to phase alpha, but not such as to cause breakages and/or aggregations; the resulting product being then brought again to room temperature by means of a non-instantaneous cooling of the order of at least 10 seconds.

9 Claims, 5 Drawing Sheets

ALPHA-ALUMINA IN THE FORM OF SPHERICAL NON-AGGREGATED PARTICLES HAVING A NARROW SIZE DISTRIBUTION AND SIZES BELOW 2 MICRONS AND PROCESS FOR PREPARING SAME

This application is a continuation of application Ser. No. 818,674 filed Jan. 14, 1986, now abandoned.

This invention relates to spherical non-aggregated particles of alpha-alumina and to a process for preparing same.

More particularly, the invention relates to alpa-alumina consisting essentially of spherical, non-aggregated, mono-dispersed or polydispersed particles having a low polydispersion index and an average diameter ranging from 0.06 to 2 μm.

Alpha-alumina has a wide range of uses: for example, as a material for use in the electronics arts, in the preparation of substrates for semiconductors or in the packing of integrated circuits; as ceramic materials, in particular for the manufacture of cutting devices, of blades for turbines, of tubes for sodium vapor lamps, of synthetic gems; as a catalyst, or as a catalyst carrier in heterogeneous catalysis; as well as for a plurality of other uses.

The ceramic materials prepared with alpha-alumina are very interesting, owing to their mechanical properties, thermal conductivity and dielectric constant at high temperatures, so that they enable one, in particular, to prepare electrical and thermal insulating materials.

The ceramic cutting tools obtained with alpha-alumina exhibit a very high hardness and are resistant to very high temperatures.

Various types of hydrated, amorphous or crystalline alumina are well known, these having a water content which can vary up to a maximum of about 35% by weight.

Several processes are available for preparing hydrated aluminas with a water content ranging from 15 to 35% by weight in the form of spherical, non-aggregated, monodispersed or polydispersed particles having a narrow size distribution and sizes below 1 micron or up to a few microns.

The abovesaid kinds of hydrated alumina can be subjected to thermal treatments in order to reduce the water content for obtaining gamma-alumina. Generally, the water content in these aluminas is of the order of about 2% by weight. The thermal treatments for preparing gamma-alumina are carried out at temperatures ranging from 550° to 850° C. during a few hours.

By the heretofore known calcination methods employed in the art, it is possible to obtain gamma-alumina in the form of spherical particles, monodispersed or polydispersed with a low polydispersion index, having sizes below 1 micron or of the order of a few microns, and being non-aggregated, starting from the precursors of hydrated alumina, in an amorphous or crystalline form, having the same morphological characteristics as the gamma-alumina to be prepared.

The gamma-alumina obtained exhibits a reduction in diameter of the particles of about 10%, as compared with the sizes of the precursors particles.

During the thermal treatment for the formation of this crystalline phase, the surface area tends to increase until it reaches values of about 60 $m^2/g$ or higher.

The porosity of the obtained gamma-alumina is higher than that of the starting precursors.

Thermal treatments for obtaining gamma-alumina with the morphological characteristics mentioned hereinbefore are described, for example, by E. Matijevic et al in "Heterogeneous Atmospheric Chemistry Geophysical Monograph Series", Vol. 26, pages 44–49 (1982).

Matijeviè describes the preparation of spherical particles of hydrated, non-aggregated alumina, having a very narrow size distribution, by reacting liquid drops of a monodispersed aerosol of aluminum sec.butoxide with water vapor.

The spherical particles of hydrated alumina in amorphous phase were then subjected to calcination during 8 hours at a temperature of 700° C., thus obtaining gamma-alumina having the same characteristics as the starting precursors, but with a reduction in the particle diameter of about 10%.

Another method of preparing spherical particles of gamma-alumina having a controlled morphology is described in the *Journal of Material Science*, 6 (1971), pages 218-224: "Preparation of Ultrafine Alumina Powders by Plasma Evaporation". The gamma-alumina obtained by this preparation method contains small amounts of delta-alumina, another crystalline phase of alumina. From the photographs of the product obtained, which are shown in this article, it is possible to observe, however, that the particles exhibit a high degree of agglomeration which renders the mixtures of these alumina phases thus prepared little utilizable in practice.

From the technical and patent literature, there are known thermal treatments for transforming precursors of hydrated alumina, amorphous or crystalline, or of gamma-alumina into other alumina crystalline phases, such as delta-alumina, theta-alumina and eta-aluminum, or mixtures thereof, by operating at temperatures higher than 850° up to about 1100° C. The products obtained from these crystalline transformations, however, tend to aggregate and are polydispersed with a high polydispersion index.

From the prior art, there are also knon thermal treatments for preparing alpha-alumina by subjecting the precursors to temperatures higher than 1100° C.

An alpha-alumina in the form of spherical particles, free from aggregated or sintered particles, monodispersed or polydispersed with a low polydispersion index, has never been obtained by operating according to the known thermal treatments.

By subjecting to calcination at temperature higher than 1100° C. the precursors of hydrated, amorphous or crystalline alumina in the form of spherical, monodispersed or polydispersed with a low polydispersion index, non-aggregated particles, it is possible to cause the conversion of alumina in the alpha-crystalline phase, but the particles do not retain the morphology and the monodispersion or polydispersion of the starting precursors any longer because they tend to break, to sinter, or to aggregate with one another.

In an article entitled "Preparation and Sintering Behavior of fine Grained $Al_2O_3$–$SiO_2$ Composite" by P. E. Debely, E. A. Barringer and H. Kenkt Bowen, published on the occasion of the 37th Pacific Coast Regional Meeting, Amer. Ceram. Soc., on Oct. 30, 1984, it is explicitly set forth that there is no method capable of producing alpha-alumina in the form of spherical, submicronic, monodispersed and non-agglomerated particles. The authors state that the control of the size of the spherical, monodispersed, non-aggregated particles of the starting hydrated alumina precursor gets lost during the conversion to alpha-alumina.

The alpha-alumina, prepared by means of the calcining processes known in the prior art, no longer possesses the sphericity and morphology characteristics of the starting precursor. The analysis of the commercially available samples obtained by classification through centrifugation reveals that the alpha-alumina is in the form of non-spherical particles and that aggregates are present.

Figure 8:
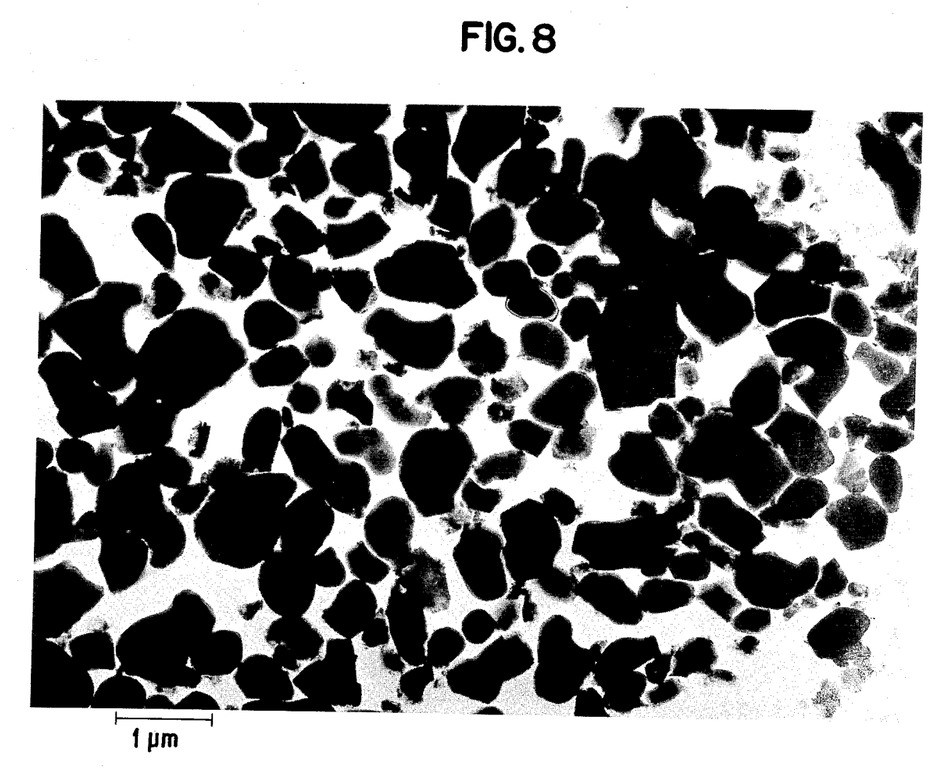

FIG. 8 below shows, as an example, a photograph obtained by a transmission electron microscope (TEM) of commercial alpha-alumina products.

There was a great demand for alpha-alumina in the form of spherical, monodispersed or polydispersed with a low polydispersion index, non-aggregated particles for achieving a further improvement in the mechanical, thermal and electrical properties of the materials prepared by using alpha-alumina as described hereinbefore.

The term "monodispersed particles", whenever used in the present application, means particles of alpha-alumina having a polydispersion index measured by $(dw/dn) \leq 1.20$, in which dw is the weight average diameter of the particles and dn is the average number diameter.

The term "polydispersed alpha-alumina" means the particles having a ratio $(dw/dn) \leq 2$; in particular, if $(dw/dn) \leq 1.30$, the particles are considered to have a low polydispersion index.

It has now, surprisingly, been found tht it is possible to prepare alpha-alumina consisting essentially of spherical, polydispersed, non-aggregated particles, in particular monodispersed or polydispersed particles having a low polydispersion index $(dw/dn) \leq 1.30$).

A further object of the present invention is that of providing mixtures of alpha-alumina with theta- and/or delta-alumina having a high alpha content $\geq 70\%$ by weight, consisting essentially of spherical particles, having the granulometric characteristics described hereinbefore.

Another object of the present invention is that of providing a process for preparing spherical particles of alpha-alumina, or mixtures thereof, with theta- and/or delta-alumina, having the characteristics mentioned hereinabove, which permits a wide choice of the particles diameter, the desired diameter being obtainable in a very narrow size distribution range.

The alpha-alumina of the invention consists essentially of solid, spherical, non-aggregated particles having an average number diameter ranging from 0.06 to 2 $\mu$m, a polydispersion index dw/dn lower than or equal to 2.0, wherein dw is the weight average diameter and dn is the average number diameter, the total porosity of the micro/meso-type being below 0.3 cc/g, the specific surface area being between 0.7 and 80 m$^2$/g, and the apparent density of the particles being in the range of from 3.20 to 3.94 g/cm$^3$.

In the above definition of this invention, the term "porosity of the micro type" means pores having a diameter below 20 Å the term "porosity of the meso type" means pores having a diameter ranging from 20 to 500 Å, according to IUPAC 1972 classification.

The average sizes (dw and dn), as well as the morphological and granulometric characteristics, are determined under the electron microscope according to the TEM technique. The method of determining dw and dn is described by E. A. Collins, J. A. Davidson and C. A. Daniels in "Review of Common Methods of Particles Size Measurement", *Journal of Paint Technology*, Vol. 47, No. 604, May 1975.

The alpha-crystalline phase of alumina is determined by means of the X-ray diffraction pattern of the powders according to method J.C.P.D.S. No. 10-173. The apparent density of the particles is measured according to the Beckman Air Comparison Pycnometer method with helium.

Specific surface area and porosity are determined according to the dynamic BET method with nitrogen.

The preferred products of the invention have generally a diameter in the range of from 0.1 to 1 $\mu$m and a polydispersion index below or equal to 1.30. More particularly, if the diameter ranges from 0.2 to 0.6 $\mu$m, the product is monodispersed, i.e., the polydispersion index is below or equal to 1.20.

In particular, it has been found that the alpha-alumina obtained by the process of this invention exhibits very low porosities of the micro/meso types, even below 0.1 cc/g, or that it is even possible to obtain a non-porous alpha-alumina. This result is so much the more surprising as the gamma-alumina, obtained by means of the thermal treatments described hereinbefore from hydrated alumina precursors, exhibits an increased porosity as compared with the starting precursors.

In fact, it could be expected that the alpha-alumina, being obtained through thermal treatments carried out at temperatures higher than the ones required for obtaining gamma-alumina, should exhibit a higher porosity increase than the starting precursors.

This fact represents another aspect of the invention, as the properties of the materials preparable with the above-said alpha-alumina particles with very low porosities, or free from porosity, prove to be improved.

According to another aspect of the invention, the alpha-alumina is obtainable also in admixture with other crystalline phases, such as delta- and/or theta-alumina, said mixtures having an alpha-phase content $\geq 70\%$ by weight, the particles of the various phases forming the mixtures consisting essentially of spherical, non-aggregated and monodispersed or polydispersed, as is defined hereinbefore. The determination of the delta- and theta-alumina crystalline phases is accomplished by means of the X-ray diffraction pattern of the powders according to method J.C.P.D.S. No. 16-394 and No. 11-517, respectively.

The alpha-alumina or the mixtures including alpha-alumina of the present invention are very pure, generally of the order of 99.98% by weight, in particular $\geq 99.99\%$ by weight.

The process for preparing the alpha-alumina, or mixtures thereof, with delta- and/or theta-alumina of the invention, consists in subjecting to particular thermal treatments a precursor consisting essentially of hydrated alumina, amorphous or crystalline, with a meter content up to about 35% by weight, or of gamma-alumina, or mixtures of the above said precursors. More particularly, the process for preparing the alpha-alumina of the invention consists in subjecting a precursor of the alpha-alumina, having a water content from about 2 to about 35% by weight, consisting essentially of spherical, non-aggregated particles, having a polydispersion index lower than or equal to 2.0, an average number diameter of from 0.07 to 2.3 $\mu$m, to a thermal treatment, by instantaneously bringing the precursor from starting temperatures ranging from room temperature to 850° C., to the thermal treatment temperatures, in the range of from 1130° to 1700° C., and for times, as generally indicated for each temperature in FIG. 1 between straight lines (a) and (b), which are sufficient for converting the precursor to the alpha-phase, but not such as to cause breakages and/or aggregations of the product, and by bringing the resulting product again to room temperature through a non-instantaneous cooling over a period of time of the order of at least 10 seconds.

Figure 1:
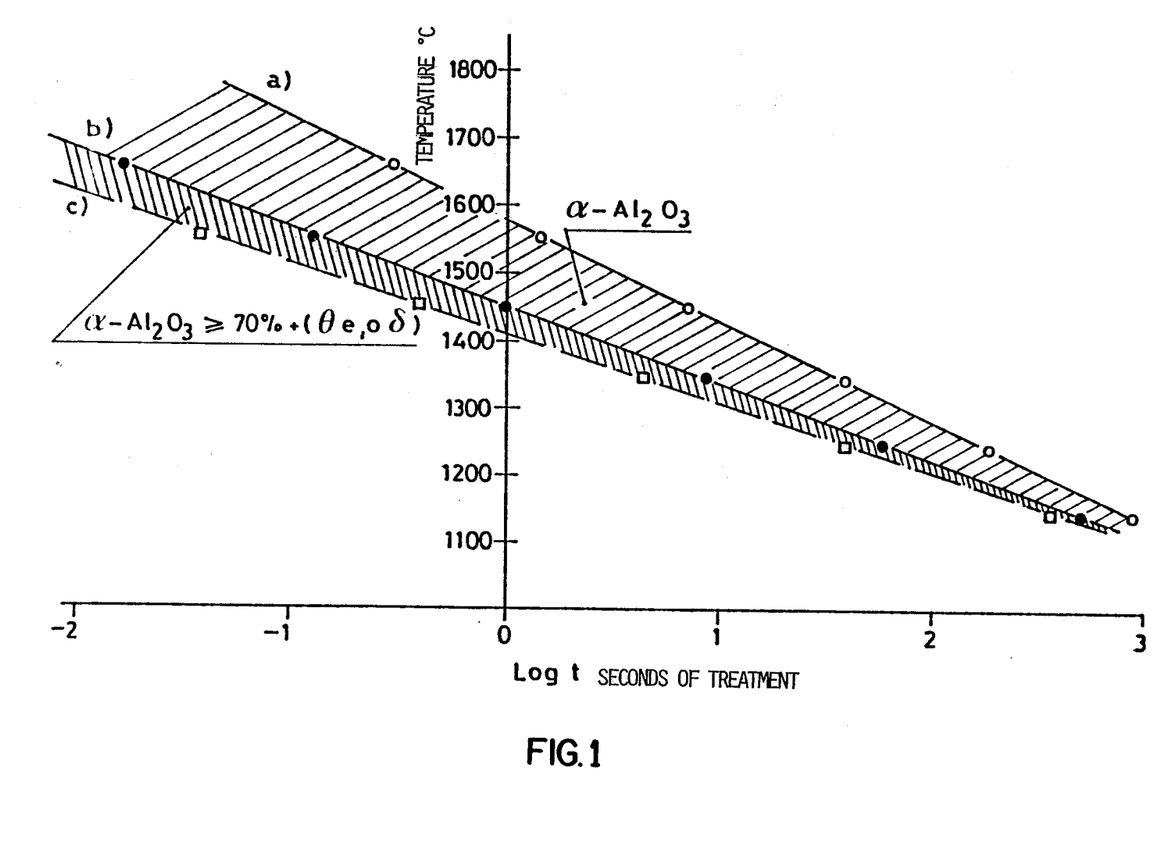
FIG. 1 shows the relation of time vs. temperature in the thermal treatment for converting a precursor of the alpha-alumina to the alpha-alumina product of this invention.

The thermal treatment time is strictly related to the temperature, which means that the higher the temperature, the shorter is the time required for the conversion of the precursor to the alpha form. FIG. 1 shows the time ranges utilizable for each temperature in the above-indicated range. Straight line (b) has been drawn on the basis of the minimum thermal treatment time necessary to obtain alpha-alumina with the morphological characteristics cited hereinbelow, using a precursor consisting essentially of particles having an average number diameter of 0.07 μm. Straight line (a) has been drawn on the basis of the maximum thermal treatment times for a precursor consisting essentially of particles having an average number diameter of 2.3 μm. The abovesaid minimum and maximum times were determined for a meaningful number of temperatures in the range being considered. In fact, once the temperature has been fixed, the treatment time varies as a function of the precursor sizes. In particular, the greater the precursor sizes, the longer is the minimum time required for obtaining the alpha-alumina having the characteristics reported hereinbefore. The time range, once a temperature has been fixed, lies between upper straight line (a) and an intermediate straight line lying between (a) and (b). Actually, if one operates with times shorter than those of said intermediate straight line, no complete conversion of the precursor to the alpha-phase takes place. Conversely, if one starts from precursors having lower particle diameters, the thermal treatment time, once a temperature has been fixed, lies between straight line (b) and a straight line below the maximum straight line (a). A technician skilled in the art will be able, without any difficulty, to determine the intermediate straight line lying between straight lines (a) and (b) in order to obtain the desired alpha-alumina with the characteristics of the invention.

In fact, when one operates for times higher than said intermediate straight line, the product tends to break or to aggregate.

Furthermore, it has been found that once the temperature of the thermal treatment has been fixed, the thermal treatment time varies as a function of the precursor utilized.

If amorphous hydrated alumina is utilized as a precursor, the thermal treatment time always lies between straight lines (a) and (b), and it varies as a function of the particle diameter, as described hereinbefore, but it is proportionally higher than the one for a precursor consisting essentially of hydrated crystalline alumina or gamma-alumina.

Since such latter precursors have already undergone a thermal treatment for being obtained, they require a shorter time for being converted to the alpha-phase. Thus, FIG. 1 generally indicates the ranges of the thermal treatment time—once a temperature has been fixed—which are employable for any precursor type and for any diameter of the precursor particles. Those skilled in the art will be able to easily determine the best values of the time range at a temperature fixed as a function of the variables described hereinbefore. As an example, there are reported below a few time ranges (t), at certain temperatures (T), as a function of average number diameters $\phi$ of the precursors and for different types of precursors.

Hydrated amorphous alumina precursor consisting essentially of spherical particles, having the morphological characteristics indicated hereinbefore:

| T (°C.) | t |
|---|---|
| | for $\phi$ = 0.37 μm: |
| 1150 | 7–10 (minutes) |
| 1350 | 12–18 (seconds) |
| | for $\phi$ = 0.15 μm: |
| 1150 | 6–8.5 (minutes) |
| 1350 | 8–15 (seconds) |

Gamma-alumina precursor:

| T (°C.) | t |
|---|---|
| | for $\phi$ = 0.28 μm: |
| 1350 | 8–13 (seconds) |
| 1450 | 1–2 (seconds) |

A necessary condition to obtain the alpha-alumina with the characteristics of this invention is therefore to carry out thermal treatments within the time and temperature conditions specified hereinbelow. However, the abovesaid condition is not sufficient for obtaining the alpha-alumina of the invention.

In fact, it has been found that in order to impart to the alpha-alumina the morphological and granulometric characteristics of this invention, it is unavoidable to carry out the thermal treatment by bringing the precursor from room temperature instantaneously to the treatment temperature.

Actually, it has been found that if the precursor powders are introduced into the system employed for the thermal treatment, and if the treatment temperature is reached by using the conventional calcining methods according to non-instantaneous thermal rise diagrams, the results of the present invention cannot be achieved.

It is necessary that the apparatus to be utilized for the thermal treatment should be already regulated at the treatment temperatures and that the precursor, at room temperature, should be introduced thereinto instantaneously.

When gamma-alumina is employed as a precursor, if said gamma-alumina has been already preformed and if it is at room temperature, one operates as indicated hereinabove.

It is possible, however, to utilize directly the gamma-alumina obtained at temperature from 550° to 850° C. by instantaneously introducing it, from such temperatures, into a second thermal treatment apparatus which is already adjusted to the required temperature.

Analogously, one may start from initial temperatures of the powders ranging from room temperature to the gamma-phase formation temperature, i.e., to formation temperatures of precursors comprising mixtures of gamma-alumina and crystalline hydrated alumina, and to instantaneously introduce same into the thermal treatment system pre-adjusted to the desired temperature.

After the treatment at the desired temperature and for the above-indicated times has taken place, the powder must not be instantaneously quenched, but a more or less quick cooling is required to bring back to room temperature the powder. The term "more or less quick cooling", whenever used in the present application, means a cooling during a time period which is of the order of a few seconds, generally higher than or equal to 10 seconds.

It has been found that cooling of the powders for achieving the results of the present invention can be effected by extracting the powder from the thermal treatment system and then leaving it at room temperature.

By operating under the conditions specified hereinabove, it is possible to obtain the alpha-alumina of the invention at 100%. Nevertheless, mixtures of alpha-alumina containing delta- and/or theta-alumina, provided the alpha- content is at least 70% by weight, fall within the scope of the present invention.

These mixtures are obtainable either by operating between straight lines (a) and (b), provided the treatment time is not sufficient for the complete conversion to the alpha-phase, as is described hereinbefore, or by operating in the area between straight lines (b) and (c) of FIG. 1.

The thermal treatment of the invention may be accomplished by any per se conventional means. For example, one may utilize static, rotary, fluid bed furnaces, or the like, that are well known per se.

The results attained with the treatment according to this invention are all the more surprising, as the prior art treatments for preparing a gamma-alumina capable of retaining the morphological and granulometric characteristics of the precursors were carried on during long tims so to permit the precursors of hydrated alumina, amorphous or crystalline, to recrystallize under thermodynamic equilibrium conditions and, in consequence, to permit a controlled phase conversion.

In this way, also, the water loss from the precursors occurred in a controlled manner and the precursors retained their morphological characteristics during the phase-conversion.

It was, therefore, expectable that it should be operated under thermodynamic equilibrium conditions also for converting aluminas to the phase obtainable at higher temperatures.

Contrary to all expectations, it has, conversely, been found that it is essential, in order to retain the precursors' morphology and particle size, thus preventing any aggregation, sintering or breaking phenomena, to carry out the thermal treatments according to instantaneous thermal rise diagrams and for the short times, as are generally indicated in FIG. 1.

The cooling, at the end of the treatment as described hereinbefore, should not be instantaneous, i.e. like a quenching, but should last at least 10 seconds. As already mentioned, any precursor of alpha-alumina, or mixtures thereof, can be used for preparing the alpha-alumina of the present invention, provided the above-said granulometric and morphological characteristics are exhibited.

There are various processes of the prior art for preparing the abovesaid precursors; for example, there may be cited those which utilize the formation of an aerosol, or the controlled homogeneous precipitation in water solutions.

Among the methods which utilize the formation of an aerosol, reference is to be made, for example, to the article by E. Matijevic cited above.

Another method also based on the use of an aerosol is described in European patent application No. 117,755.

Among the method which are carried out in solution, the process which has proved to be useful for the purposes of the present invention is described in *Journal Inorg. Nucl. Chem.*, 1973, Vol. 35, pages 3697–3705, by Roger Brace and Egon Matijevic, according to which hydrated alumina is prepared starting from aluminum sulphate solutions by forced hydrolysis at temperatures higher than 90° C., and usually of the order of 100° C. According to this method, a precursor consisting essentially of non-aggregated, monodispersed particles in the spherical form are obtainable by operating at concentrations in the range of from $2.10^{-4}$ to $5.10^{-3}$ moles per liter of aluminum.

The precursors are characterized, as regards their morphological and granulometric characteristics, under an electron microscope by the TEM technique, as explained hereinbefore, for alpha-alumina. The determination of the crystalline gamma-phase is accomplished by means of the X-ray diffraction pattern study of powders, according to standard J.C.P.D.S. No. 14-425.

The following examples are given merely to exemplify, but not to limit, this invention.

EXAMPLE 1

Preparation of the Precursor

Hydrated alumina $Al_2O_3.3H_2O$ ($H_2O$ content corresponding to about 35% by weight) in amorphous phase, consisting essentially of non-aggregated spherical particles having an average number diameter $dn=0.16$ $\mu m$ and a polydispersion index $dw/dn=1.19$, was prepared via aerosol, according to Example 1 of published European patent application No. EP 117,755, with the variations described hereinafter.

Dry nitrogen was employed as carrier gas, and aluminum sec. butoxide was used as the aluminum compound.

A dry nitrogen flow, having a temperature of 155° C., a flowrate of 250 l/h (measured at room temperature), which carried 8.9 g/h of aluminum sec.butoxide in the form of vapor, was mixed with a second cold nitrogen flow having a temperature of 5° C. and a flowrate of 500 l/h (measured at room temperature). The temperature at which the aerosol formed in the ejector was 55° C., and the Reynolds number in the converging portion of the ejector was 2200.

Figure 2:
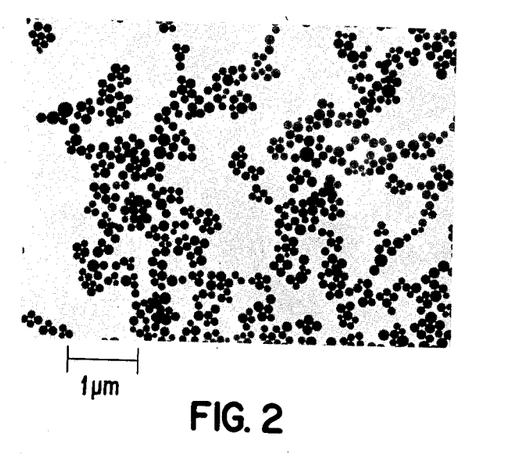
FIGS. 2 to 8 are photomicrographs respectively of:
the precursor particles described below in Example 1 (FIG. 2);
a product of the invention as described in Example 1 (FIG. 3);
a product described in Comparative Example 1A (FIG. 4);
a precursor product described in Example 2 (FIG. 5);
a product of the invention as described in Example 2 (FIG. 6);
a product of the invention as described in Example 5 (FIG. 7);
and a commercial alpha-alumina product (FIG. 8).

FIG. 2 shows a photograph taken under a trasmission electron microscope (TEM) of the thus-obtained precursor particles having the above-indicated sizes. The magnification is 10,000 times.

The precursor consists essentially of perfectly spherical, non-agglomerated and water-dispersible particles.

The powder's X-ray pattern reveals that the hydrated alumina obtained is in the amorphous form.

Preparation of Alpha-Alumina 10 g of $Al_2O_3.3H_2O$, obtained as specified above, were subjected at room temperature to an instantaneous thermal treatment by introducing the powder into a horizontal furnace manufactured by Heraeus, already adjusted to a temperature T of 1150° C.

The powder was left at such temperature during a time of 8 minutes.

At the end of the treatment, the powder was brought again to room temperature by withdrawing the sample from the furnace.

The cooling time was of the order of a few minutes.

The resulting product exhibits the following characteristics:
morphology: non-aggregated spherical particles;
$dn = 0.12$ μm;
polydispersion index $dw/dn = 1.19$;
apparent density of the particles $(g/cm^3) = 3.30$;
surface area $(m^2/g) = 7$; and
porosity $(cc/g) = 0.01$. The product purity is higher than 99.99%.

Figure 3:
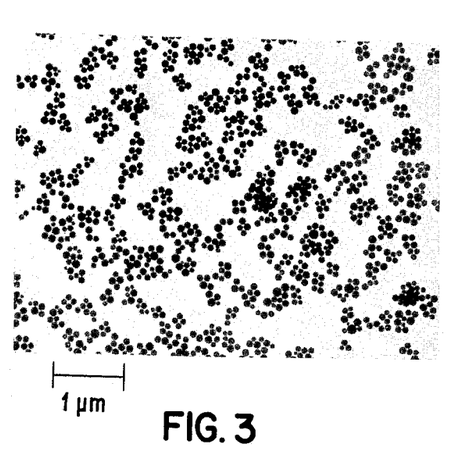

FIG. 3 shows a photograph taken under an electron microscope (TEM) of the product obtained. The magnification is 10,000 times.

The X-ray pattern of the powders of the product thus obtained reveals that alumina is all in the alpha-phase.

COMPARATIVE EXAMPLE 1A 10 g of precursor $Al_2O_3.3H_2O$, obtained as in Example 1, were introduced into the furnace where the thermal treatment was carried out, at room temperature. Subsequently, the thermal treatment temperature indicated in Example 1 was reached in 6 hours, and the sample was left at such temperature for the time as indicated in Example 1.

Cooling of the powder was the same as in Example 1.

Figure 4:
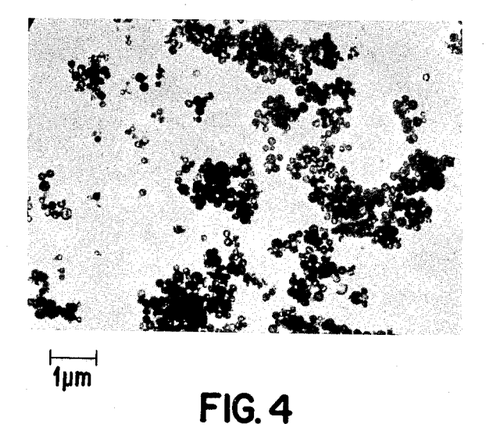

The X-ray analysis (powder pattern) reveals that the product is all in the alpha form, but the particles do not retain the morphological and granulometric characteristics of the precursor. FIG. 4 shows a photograph, taken under a transmission electron microscope (TEM), of the product obtained. It is possible to observe that the particles are no longer spherical, that they tend to break, and that they are affected by considerable aggregation and sintering phenomena.

From a comparison between Example 1 and Comparative Example 1A, it is apparent that if the diagram of the thermal rise of the powder from room temperature to the treatment temperature is not instantaneous, the morphological characteristics of the precursor are not maintained.

COMPARATIVE EXAMPLE 1B 10 g of $Al_2O_3.3H_2O$, obtained according to the process described in Example 1, were subjected to the same treatment of Example 1, but the treatment time was 2 minutes.

The X-ray pattern of the powders reveals that the product consists essentially of a mixture of delta-alumina and alpha-alumina (80% by weight of delta-alumina), and that the product retains the precursor's characteristics.

Comparative Example 1B, compared with Example 1, shows that only a partial conversion to alpha-alumina occurred.

COMPARATIVE EXAMPLE 1C

Comparative Example 1B was repeated, but the thermal treatment was carried on during 1 minute.

Under X-ray analysis, the product is revealed to be delta-alumina without the presence of any alpha-phase.

The product retains the initial characteristics and a decrease by about 10% in the particle diameter dn is observed.

EXAMPLE 2

Preparation of the Precursor 10 g of $Al_2O_3.3H_2O$, prepared according to Example 1, were subjected to a thermal treatment at 800° C. during a time of 4 hours, utilizing a 2-hour thermal rise diagram.

It was cooled down and the powder was taken out of the furnace (the cooling t was of a few minutes).

The X-ray analysis (powder pattern) reveals that the product consists essentially of gamma-alumina (water content: about 3% by weight).

Figure 5:
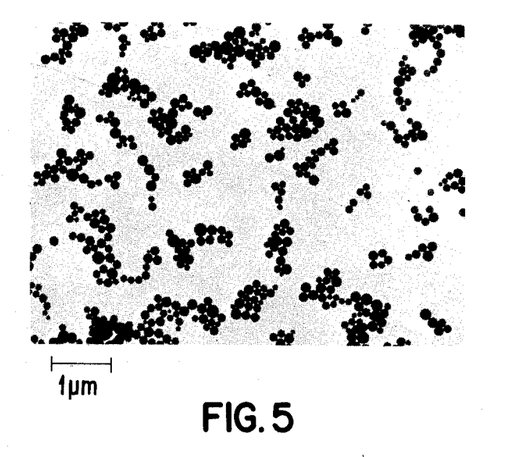

FIG. 5 shows a photograph, taken under the electron microscope (TEM), of the product obtained. The magnification is 10,000 times.

The product retains the sphericity and non-agglomeration characteristics of the precursor.

The product characteristics are as follows:
$dn = 0.15$ μm;
polydispersion index $dw/dn = 1.2$;
apparent density of the particles $= 3.1$ g/cm$^3$;
specific surface area $= 58$ m$^2$/g; and
porosity $= 0.10$ cc/g.

Preparation of Alpha-Alumina 5 g of gamma-alumina, obtained at room temperature, were subjected to the thermal treatment of Example 1.

Figure 6:
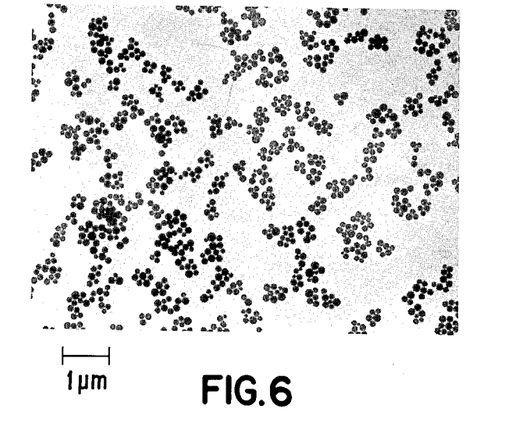

FIG. 6 shows a photograph taken under the transmission electron microscope (TEM). The magnification is 10,000 times.

As is apparent from the photograph, the product retains the morphological characteristics of the precursor and no aggregates are present.

The product exhibits the following characteristics:
$dn = 0.11$ μm;
polydispersion index $dw/dn = 1.20$;
porosity $= 0.01$ cc/g;
specific surface area $= 6.9$ m$^2$/g;
apparent density of the particles $= 3.4$ g/cm$^3$; and
X-ray pattern of the powders: alpha-alumina.

COMPARATIVE EXAMPLE 2A 9 g of gamma-alumina, obtained according to Example 2, were subjected to the thermal treatment of Comparative Example 1A.

The resulting product revealed the same breaking and aggregation phenomena of the particles as shown in Comparative Example 1A.

EXAMPLE 3

5 g of gamma-alumina, obtained according to Example 2, at a temperature of 800° C. were subjected to the thermal treatment indicated in Example 1.

The product obtained has characteristics similar to those described in Example 2.

EXAMPLE 4

Example 1 was repeated, but carrying out the thermal treatment at T=1350° C. during a time of 10 seconds.

The resulting product exhibits the same characteristics as in Example 1.

EXAMPLE 5

10 g of $Al_2O_3.3H_2O$, having a dn=0.32 μm and a poly-dispersion index dw/dn=1.17, consisting essentially of spherical, non-aggregated particles, were obtained via aerosol, as explained in Example 1, but under the following modified conditions:

the dry nitrogen flowrate, at a temperature of 158° C., was 200 l/h;

the gas carried 7.4 g/h of aluminum sec.butoxide;

the second gaseous stream consisted of dry $N_2$ at a temperature of 0° C. and was at a flowrate of 400 l/h; and the Reynolds number was 1800.

The aerosol formation temperature was 53° C.

In the hydrolysis chamber, the contact time was 57 seconds, and the molar ratio $H_2O$/Al sec.butoxide was 8.

The treatment indicated in Example 3 was repeated.

The product obtained consists essentially of alpha-alumina and exhibits the following characteristics:

dn=0.28 μm;

dw/dn=1.20;

the product does not exhibit any porosity;

surface area=4.8 m²/g; and apparent density of the particles=3.4 g/cm³.

Figure 7:
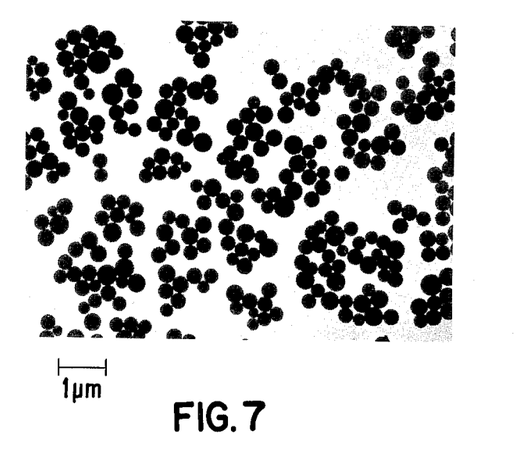

The photograph in FIG. 7, taken under the transmission electron microscope (TEM), shows that the product consists essentially of spherical, non-aggregated particles. The magnification is 10,000 times.

EXAMPLE 6

10 g of $Al_2O_3.3H_2O$, consisting essentially of spherical and non-aggregated particles having an average diameter dn=1.35 μm, a ratio dw/dn=1.15, were prepared according to the method described in Example 1 via aerosol, by employing the following conditions:

the first gaseous stream at T=156° C. was at a flowrate of 300 l/h, conveyed 10.7 g/hour of aluminum sec. butoxide;

the second gaseous stream had a temperature of 0° C. and a flowrate of 300 l/h;

The aerosol formation temperature was 78° C.; and the hydrolysis time was 56 seconds and the molar ratio $H_2O$/aluminum sec.butoxide was 15.

The resulting product was subjected to the treatment of Example 1, but employing a T of 1450° C. and a t of 5 seconds.

The product obtained consists essentially of spherical and non-aggregated particles of alpha-alumina and exhibits the following characteristics:

dn=1.20 μm; and polydispersion index dw/dn=1.17.

EXAMPLE 7

Example 6 was repeated by conducting the thermal treatment at T=1250° C. during a time of 90 seconds.

The product consists essentially of alpha-$Al_2O_3$, and exhibits morphological and granulometric characteristics similar to those of Example 6.

EXAMPLE 8

A solution of $Al_2(SO_4)_3$, at a concentration of $2.10^{-3}$ moles/l of Al, was aged for one week at 98° C. until 2 g of $Al_2O_3.3H_2O$ were obtained.

The pH value of the starting solution was about 4; after aging, the pH value of the solution was about 3.

The product thus obtained consists essentially of spherical, non-aggregated, monodispersed particles having a dn=0.55 μm and a polydispersion index dw/dn=1.14.

Preparation of Alpha-Alumina

The product obtained as described hereinbefore was subjected to the thermal treatment of Example 1.

On analysis, the product is shown in be alpha-$Al_2O_3$ and consists essentially of spherical, monodispersed, non-aggregated particles having:

dn=0.45 μm;

polydispersion index dw/dn=1.14; and apparent density of the particles 3.90 g/cm³.

What is claimed is:

1. Alpha-alumina consisting essentially of solid, spherical non-aggregated particles, having an average number diameter ranging from 0.06 to 2 μm, a polydispersion index dw/dn lower than or equal to 2.0, wherein dw is the weight average diameter and dn is the average number diameter, the total porosity of micro-meso type being lower than 0.3 cc/g, the specific surface area ranging from 0.7 to 80 m²/g, and the apparent density of the particles being in the range of from 3.20 to 3.94 g/cm³; and wherein "porosity of the micro type" means pores having a diameter below 20 A and "porosity of the meso type" means pores having a diameter ranging from 20 to 500 A according to IUPAC 1972 classification.

2. Alpha-alumina according to claim 1, in which the average number diameter ranges from 0.1 to 1 μm and polydispersion index is lower than or equal to 1.30.

3. Alpha-alumina according to claim 2, in which the average number diameter ranges from 0.2 to 0.6 μm and the polydispersion index is lower than or equal to 1.20.

4. Alpha-alumina according to claim 1, 2 or 3, in which the porosity is lower than 0.1 cc/g.

5. Alpha-alumina according to claim 4, in which the porosity has values of about zero.

6. Alpha-alumina according to claim 1, in admixture with delta- and/or theta-alumina, in which the alpha-alumina content is ≧70% by weight.

7. A process for preparing alpha-alumina according to claim 1, characterized in that an alpha-alumina precursor, having a water content ranging from about 2% to about 35% by weight, consisting essentially of spherical, non-aggregated particles, having a polydispersion index below 2.0, an average number diameter φ from 0.07 to 2.3 μm, is subjected to a thermal treatment by instantaneously bringing the precursor from initial temperatures between the room temperature and 850° C. to thermal treatment temperatures between 1130° and 1700° C. and for times, indicated for each temperature in FIG. 1 between straight lines (a) and (b), which are sufficient to convert the precursor to the alpha-phase, but are not such as to cause breaking and/or aggregation of the product, by bringing the resulting product again to room temperature by means of a non-instantaneous cooling of the order of at least 10 seconds.

8. The process for preparing alpha-alumina according to claim 7, in which the precursor consisting essentially of hydrated alumina, having a $\phi$ of 0.37 $\mu$m, is subjected to thermal treatments for times ranging from 7 to 10 minutes for a temperature T of 1150° C., and from 12 to 18 seconds for a temperature of 1350° C.

9. A process for preparing alpha-alumina according to claim 8, in which the diameter of the particles is 0.15 $\mu$m and the treatment time ranges from 6 to 8.5 minutes for a temperature T of 1150° C., and from 8 to 15 seconds for a temperature T of 1350° C.

* * * * *